United States Patent
Kawamoto et al.

(10) Patent No.: US 8,179,850 B2
(45) Date of Patent: May 15, 2012

(54) MOBILE COMMUNICATION SYSTEM, MOBILE COMMUNICATION METHOD, AND RADIO NETWORK CONTROLLER CAPABLE OF CHANGING COMMUNICATION STATES

(75) Inventors: Junichiro Kawamoto, Tokyo (JP); Akihito Hanaki, Yokohama (JP); Takahiro Hayashi, Yokosuka (JP); Yoshikazu Goto, Yokohama (JP); Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 466 days.

(21) Appl. No.: 12/388,724

(22) Filed: Feb. 19, 2009

(65) Prior Publication Data

US 2009/0225715 A1 Sep. 10, 2009

(30) Foreign Application Priority Data

Feb. 25, 2008 (JP) ................ P2008-043539

(51) Int. Cl.
*H04W 4/00* (2009.01)

(52) U.S. Cl. ......... 370/329; 370/341; 370/431; 370/437

(58) Field of Classification Search ............. 370/329, 370/341, 431, 437
See application file for complete search history.

(56) References Cited

U.S. PATENT DOCUMENTS

| 2007/0281695 A1* | 12/2007 | Lohr et al. ............... 455/442 |
| 2009/0275337 A1* | 11/2009 | Maeda et al. ............ 455/442 |
| 2010/0208686 A1* | 8/2010 | Chun et al. ............... 370/329 |
| 2011/0021239 A1* | 1/2011 | Wakabayashi et al. ..... 455/522 |

FOREIGN PATENT DOCUMENTS

| EP | 1 802 160 A1 | 6/2007 |
| EP | 1 802 161 A1 | 6/2007 |
| JP | 2000-505261 A | 4/2000 |
| JP | 2002-345019 A | 11/2002 |
| WO | 97/31503 A1 | 8/1997 |
| WO | 2006/016786 A1 | 2/2006 |

OTHER PUBLICATIONS

The extended European search report issued on Nov. 4, 2011 in the counterpart European patent application.
Ericsson;"HS-DSCH mobility procedures";3GPP TSG-RAN WG3#26;rb-5.3;Vienna, Austria (Jan. 14-18, 2002).
"3rd Generation Partnership Project; Technical Specification Group Radio Access Network; Enhanced uplink; Overall description; Stage2":3GPP TS 25.319;V7.4.0 (Dec. 2007).

* cited by examiner

*Primary Examiner* — Jeffrey Pwu
*Assistant Examiner* — Abdelnabi Musa
(74) *Attorney, Agent, or Firm* — Marvin A. Motsenbocker; MOTS Law, PLLC

(57) ABSTRACT

A mobile communication system is configured as a mobile station in a first communication state shifts to a second communication state when at least one high speed uplink packet communication compliant radio link is established by the mobile station.

18 Claims, 9 Drawing Sheets

MOBILE COMMUNICATION SYSTEM, MOBILE COMMUNICATION METHOD, AND RADIO NETWORK CONTROLLER CAPABLE OF CHANGING COMMUNICATION STATES

CROSS REFERENCE TO RELATED APPLICATION

This application is based upon and claims the benefit of priority from prior Japanese Patent Application No. 2008-043539, filed on Feb. 25, 2008; the entire contents of which are incorporated herein by reference.

BACKGROUND OF THE INVENTION

1. Field of the Invention

The present invention relates to a mobile communication system, a mobile communication method, and a radio network controller which are configured so that a mobile station shifts from a first communication state to a second communication state. Specifically, the first communication state is a state in which the mobile station performs high speed downlink packet communication by using a high speed downlink packet communication compliant radio link, and performs uplink packet communication by using at least one radio link not including a high speed uplink packet communication compliant radio link. The second communication state is a state in which the mobile station performs high speed downlink packet communication by using a high speed downlink packet communication compliant radio link, and performs high speed uplink packet communication by using a high speed uplink packet communication compliant radio link.

2. Description of the Related Art

In a mobile communication system adopting an Enhanced Uplink (EUL) or a High Speed Uplink Packet Access (HSUPA) scheme, and a High Speed Downlink Packet Access (HSDPA) scheme defined in 3GPP, a mobile station UE is capable of performing high speed downlink packet communication (HSDPA communication) by using a HSDPA communication compliant radio link and is also performing high speed uplink packet communication (EUL communication) by using an EUL communication compliant radio link (see Published Japanese translation of a PCT application No. 2000-505261).

In the above-described mobile communication system, the mobile station UE cannot establish the EUL communication compliant radio link with a non EUL compliant base station which is not compliant with the EUL communication. Accordingly, when existing in a cell under the control of the non EUL compliant base station, the mobile station UE cannot perform EUL communication.

Specifically, when the mobile station UE is in a cell A under the control of a non EUL compliant base station #1 which is compliant with the HSDPA communication but not compliant with the EUL communication, as shown in FIG. 1, the mobile station UE is configured to perform HSDPA communication by using the HSDPA communication compliant radio link and uplink packet communication (R99 communication, usual uplink packet communication) by a Release 99 scheme by using a non EUL communication compliant radio link (a usual radio link) (first communication state). This is because the mobile station UE is incapable of performing EUL communication by using the EUL communication compliant radio link.

However, 3GPP does not define a trigger of shift of the mobile station UE from the first communication state to a second communication state in which the mobile station UE performs HSDPA communication by using the HSDPA communication compliant radio link, and EUL communication by using the EUL communication compliant radio link. For this reason, there is a problem that even when the mobile station UE which has been in the first communication state is currently present in a cell B under the control of an EUL compliant base station #2 compliant with both the HSDPA communication and the EUL communication, the mobile station UE is not capable of changing into the second communication state.

SUMMARY OF THE INVENTION

A first aspect of the present invention is summarized as a mobile communication system in which a mobile station shifts from a first communication state to a second communication state, the first communication state being a state in which the mobile station performs high speed downlink packet communication by using a high speed downlink packet communication compliant radio link, and performs uplink packet communication by using at least one radio link not including a high speed uplink packet communication compliant radio link, the second communication state being a state in which the mobile station performs the high speed downlink packet communication by using the high speed downlink packet communication compliant radio link, and performs high speed uplink packet communication by using the high speed uplink packet communication compliant radio link. When at least one high speed uplink packet communication compliant radio link is established by the mobile station in the first communication state, the mobile station in the first communication state shifts to the second communication state.

In the first aspect of the present invention, when at least one high speed uplink packet communication compliant radio link is established by the mobile station in the first communication state, and when an amount of data in a transmission buffer of the mobile station in the first communication state exceeds a predetermined threshold value, the mobile station in the first communication state shifts to the second communication state.

In the first aspect of the present invention, when a predetermined period has elapsed after at least one high speed uplink packet communication compliant radio link is established by the mobile station in the first communication state, the mobile station in the first communication state shifts to the second communication state.

In the first aspect of the present invention, when at least one high speed uplink packet communication compliant radio link is established by the mobile station in the first communication state, and when a predetermined available resource exists in a base station with which the high speed uplink packet communication compliant radio link has been established, the mobile station in the first communication state shifts to the second communication state.

In the first aspect of the present invention, when at least one high speed uplink packet communication compliant radio link is established by the mobile station in the first communication state, and when a serving cell for the high speed downlink packet communication of the mobile station in the first communication state is switched to a base station with which the high speed uplink packet communication compliant radio link has been established, the mobile station in the first communication state shifts to the second communication state.

A second aspect of the present invention is summarized as a mobile communication system in which a mobile station shifts from a first communication state to a second communication state, the first communication state being a state in which the mobile station performs high speed downlink packet communication by using a high speed downlink packet communication compliant radio link, and performs uplink packet communication by using at least one radio link not including a high speed uplink packet communication compliant radio link, the second communication state being a state in which the mobile station performs the high speed downlink packet communication by using the high speed downlink packet communication compliant radio link, and performs high speed uplink packet communication by using the high speed uplink packet communication compliant radio link. When all radio links for the uplink packet communication of the mobile station in the first communication state are established as high speed uplink packet communication compliant radio links, the mobile station in the first communication state shifts to the second communication state.

In the second aspect of the present invention, when all radio links for the uplink packet communication of the mobile station in the first communication state are established as the high speed uplink packet communication compliant radio links, and when an amount of data in a transmission buffer of the mobile station in the first communication state exceeds a predetermined threshold value, the mobile station in the first communication state shifts to the second communication state.

In the second aspect of the present invention, when a predetermined period has elapsed after all radio links for the uplink packet communication of the mobile station in the first communication state are established as the high speed uplink packet communication compliant radio links, the mobile station in the first communication state shifts to the second communication state.

In the second aspect of the present invention, when all radio links for the uplink packet communication of the mobile station in the first communication state are established as the high speed uplink packet communication compliant radio links, and when a predetermined available resource exists in a base station with which the high speed uplink packet communication compliant radio link has been established, the mobile station in the first communication state shifts to the second communication state.

A third aspect of the present invention is summarized as a mobile communication method by which a mobile station shifts from a first communication state to a second communication state, the first communication state being a state in which the mobile station performs high speed downlink packet communication by using a high speed downlink packet communication compliant radio link, and performs uplink packet communication by using at least one radio link not including a high speed uplink packet communication compliant radio link, the second communication state being a state in which the mobile station performs the high speed downlink packet communication by using the a high speed downlink packet communication compliant radio link, and performs high speed uplink packet communication by using the high speed uplink packet communication compliant radio link. The mobile communication method includes; causing the mobile station in the first communication state to shift to the second communication state when at least one high speed uplink packet communication compliant radio link is established by the mobile station in the first communication state.

A fourth aspect of the present invention is summarized as a mobile communication method by which a mobile station shifts from a first communication state to a second communication state, the first communication state being a state in which the mobile station performs high speed downlink packet communication by using a high speed downlink packet communication compliant radio link, and performs uplink packet communication by using at least one radio link not including a high speed uplink packet communication compliant radio link, the second communication state being a state in which the mobile station performs the high speed downlink packet communication by using the high speed downlink packet communication compliant radio link, and performs high speed uplink packet communication by using the high speed uplink packet communication compliant radio link. The mobile communication method includes: causing the mobile station in the first communication state to shift to the second communication state when all radio links for the uplink packet communication of the mobile station in the first communication state are established as high speed uplink packet communication compliant radio links.

A fifth aspect of the present invention is summarized as a radio network controller used in a mobile communication system in which a mobile station shifts from a first communication state to a second communication state, the first communication state being a state in which the mobile station performs high speed downlink packet communication by using a high speed downlink packet communication compliant radio link, and performs uplink packet communication by using at least one radio link not including a high speed uplink packet communication compliant radio link, the second communication state being a state in which the mobile station performs the high speed downlink packet communication by using the high speed downlink packet communication compliant radio link, and performs high speed uplink packet communication by using the high speed uplink packet communication compliant radio link. When at least one high speed uplink packet communication compliant radio link is established by the mobile station in the first communication state, the radio network controller instructs the mobile station in the first communication state to shift to the second communication state.

In the fifth aspect of the present invention, when at least one high speed uplink packet communication compliant radio link is established by the mobile station in the first communication state, and when an amount of data in a transmission buffer of the mobile station in the first communication state exceeds a predetermined threshold value, the radio network controller instructs the mobile station in the first communication state to shift to the second communication state.

In the fifth aspect of the present invention, when a predetermined period has elapsed after at least one high speed uplink packet communication compliant radio link is established by the mobile station in the first communication state, the radio network controller instructs the mobile station in the first communication state to shift to the second communication state.

In the fifth aspect of the present invention, when at least one high speed uplink packet communication compliant radio link is established by the mobile station in the first communication state, and when a predetermined available resource exists in a base station with which the high speed uplink packet communication compliant radio link has been established, the radio network controller instructs the mobile station in the first communication state to shift to the second communication state.

In the fifth aspect of the present invention, when at least one high speed uplink packet communication compliant radio link is established by the mobile station in the first communication state, and when a serving cell for the high speed downlink packet communication of the mobile station in the first communication state is switched to a base station with which the high speed uplink packet communication compliant radio link has been established, the radio network controller instructs the mobile station in the first communication state to shift to the second communication state.

A sixth aspect of the present invention is summarized as a radio network controller used in a mobile communication system in which a mobile station shifts from a first communication state to a second communication state, the first communication state being a state in which the mobile station performs high speed downlink packet communication by using a high speed downlink packet communication compliant radio link, and performs uplink packet communication by using at least one radio link not including a high speed uplink packet communication compliant radio link, the second communication state being a state in which the mobile station performs the high speed downlink packet communication by using the high speed downlink packet communication compliant radio link, and performs high speed uplink packet communication by using the high speed uplink packet communication compliant radio link. When all radio links for the uplink packet communication of the mobile station in the first communication state are established as high speed uplink packet communication compliant radio links, the radio network controller instructs the mobile station in the first communication state to shift to the second communication state.

In the sixth aspect of the present invention, when all radio links for the uplink packet communication of the mobile station in the first communication state are established as the high speed uplink packet communication compliant radio links, and when an amount of data in a transmission buffer of the mobile station in the first communication state exceeds a predetermined threshold value, the radio network controller instructs the mobile station in the first communication state to shift to the second communication state.

In the sixth aspect of the present invention, In the sixth aspect of the present invention, when a predetermined period has elapsed after all radio links for the uplink packet communication of the mobile station in the first communication state are established as the high speed uplink packet communication compliant radio links, the radio network controller instructs the mobile station in the first communication state to shift to the second communication state.

In the sixth aspect of the present invention, when all radio links for the uplink packet communication of the mobile station in the first communication state are established as the high speed uplink packet communication compliant radio links, and when a predetermined available resource exists in a base station with which the high speed uplink packet communication compliant radio link has been established, the radio network controller instructs the mobile station in the first communication state to shift to the second communication state.

DETAILED DESCRIPTION OF THE EMBODIMENTS (Configuration of a Mobile Communication System According to a First Embodiment of the Present Invention)

A configuration of a mobile communication system according to a first embodiment of the present invention is described with reference to FIGS. 1 to 2.

In this embodiment, description is given of the mobile communication system in which an HSDPA scheme and an EUL scheme defined in 3GPP are adopted as an example. However, the present invention is not limited to this example.

Figure 1:
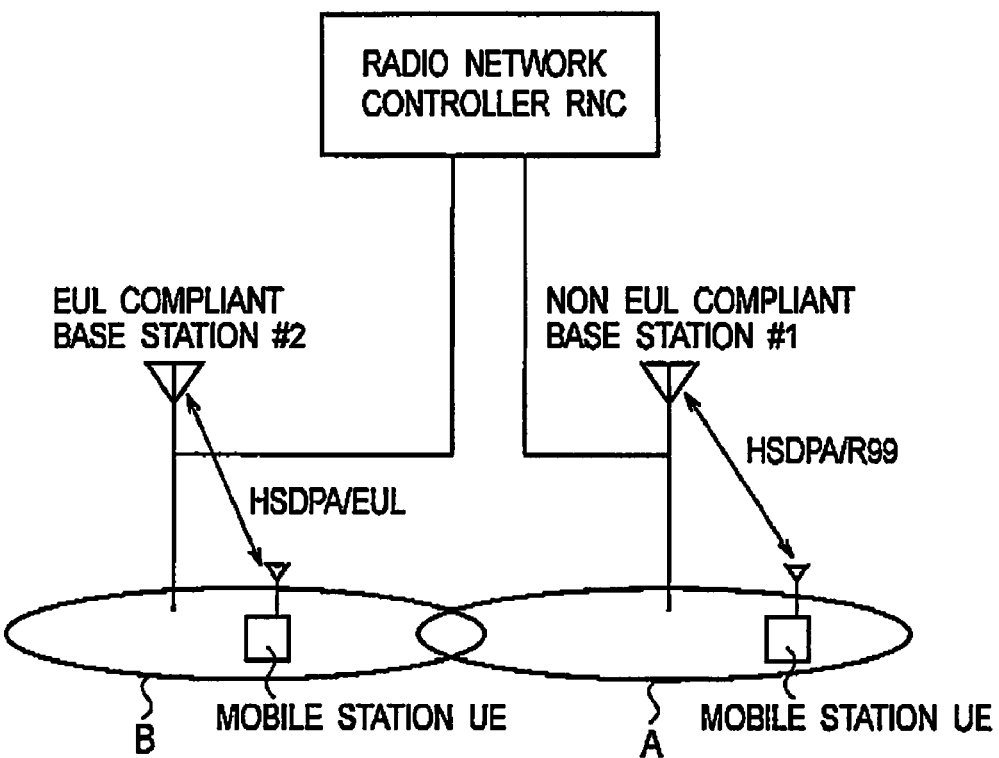
FIG. 1 is an overall block diagram of a mobile communication system according to a first embodiment of the present invention.

As shown in FIG. 1, the mobile communication system according to this embodiment includes a radio network controller RNC, a non EUL compliant base station #1, an EUL compliant base station #2, and a mobile station UE.

Here, the EUL compliant base station #2 is a base station compliant with both the EUL communication and the HSDPA communication, and the non EUL compliant base station #1 is a base station compliant with the HSDPA communication but not compliant with the EUL communication.

Further, when being present in the cell A under the control of the non EUL compliant base station #1, the mobile station UE can perform high speed downlink packet communication (HSDPA communication) by using a HSDPA communication compliant radio link, and perform R99 communication (uplink packet communication) by using at least one radio link not including an EUL communication compliant radio link (high speed uplink packet communication) (first communication state).

Meanwhile, when being present in the cell B under the control of the EUL compliant base station #2, the mobile station UE can perform HSDPA communication by using a HSDPA communication compliant radio link, and perform EUL communication by using an EUL communication compliant radio link (second communication state).

Figure 2:
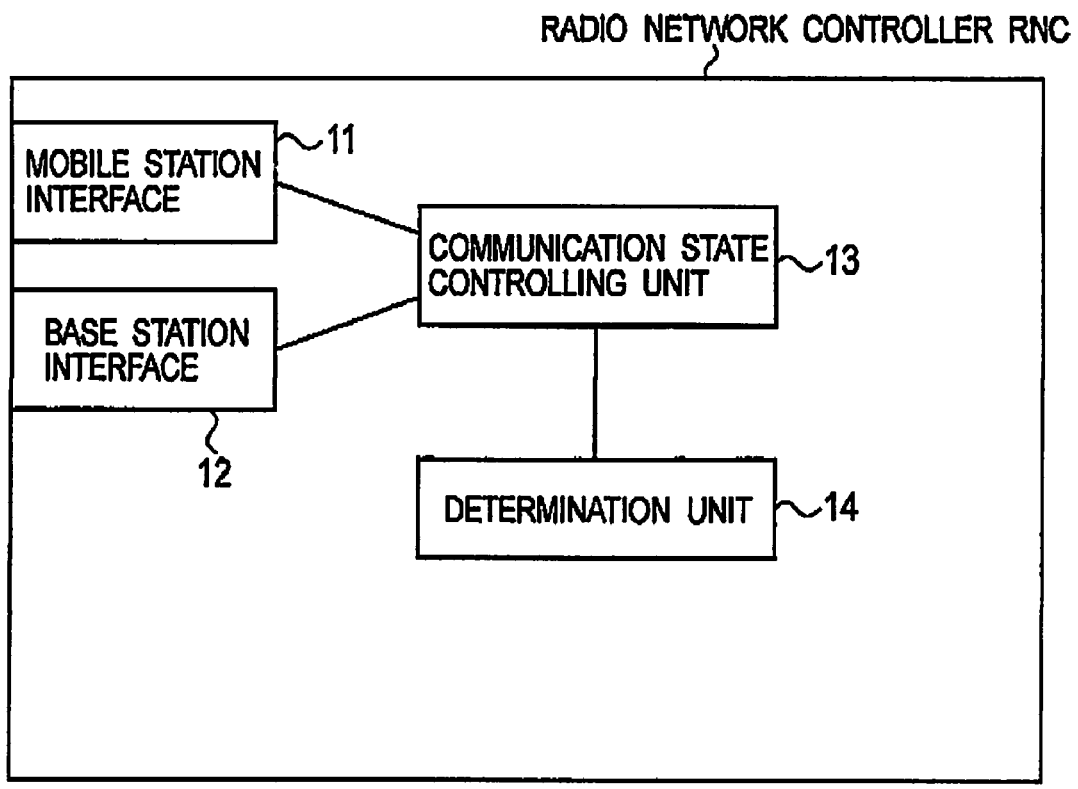
FIG. 2 is a functional block diagram of a radio network controller according to the first embodiment of the present invention.

As shown in FIG. 2, the radio network controller RNC includes a mobile station interface 11, a base station interface 12, a communication state controlling unit 13, and a determination unit 14.

The mobile station interface 11 is configured to serve as an interface with the mobile station UE. More specifically, the mobile station interface 11 is configured to perform communication with the mobile station UE by using RRC signaling and others.

The base station interface 12 is configured to serve as an interface with the non EUL compliant base station #1 and the EUL compliant base station #2. More specifically, the base station interface 12 is configured to perform communication with the non EUL compliant base station #1 and the EUL compliant base station #2 by using NBAP signaling and others.

The communication state controlling unit 13 instructs the mobile station UE in the first communication state to shift to the second communication state when an EUL connection condition #1 and an EUL connection condition are both fulfilled.

To be more specific, when the EUL connection condition #1 and the EUL connection condition #2 are both fulfilled, the communication state controlling unit 13 notifies the EUL compliant base station #2, via the base station interface 12, of a message (NBAP signaling) indicating "Radio Link Reconfiguration Commit," and, further, notifies the mobile station UE, via the mobile station interface 11, of a message (RRC signaling) indicating "Radio Bearer Reconfiguration". Accordingly, a R99 communication compliant radio link established between the EUL compliant base station #2 and the mobile station UE is switched to an EUL communication compliant radio link.

The determination unit 14 is configured to determine whether or not the EUL connection condition #1 and the EUL connection condition #2 are fulfilled.

For an example of the EUL connection condition #1, the following is cited: "At least one EUL communication compliant radio link (high speed uplink packet communication) is established by a mobile station UE", that is, "among radio links included in an active set of the mobile station UE, at least one radio link becomes an EUL communication compliant radio link"

The "active set" represents a set of radio links established by the mobile station UE.

Alternatively, the EUL connection condition #1 may be that "all the radio links for uplink packet communication of the mobile station UE are established as high speed uplink packet communication compliant radio links", that is, "all the radio links included in the active set of the mobile station UE become EUL communication compliant radio links".

Next, as examples of the EUL connection condition #2, the followings are cited.

No condition exists;
An amount of data in a transmission buffer of a mobile station UE exceeds a predetermined threshold value;
After the fulfillment of the EUL connection condition #1, a predetermined period elapses; and
In a base station in which the above-described EUL communication compliant radio link has been established, a predetermined available resource exists.

(Operation of the Mobile Communication System of the First Embodiment of the Present Invention)

Operation of the mobile communication system according to the first embodiment of the present invention is described with reference to FIGS. 3 to 9.

Figure 3:
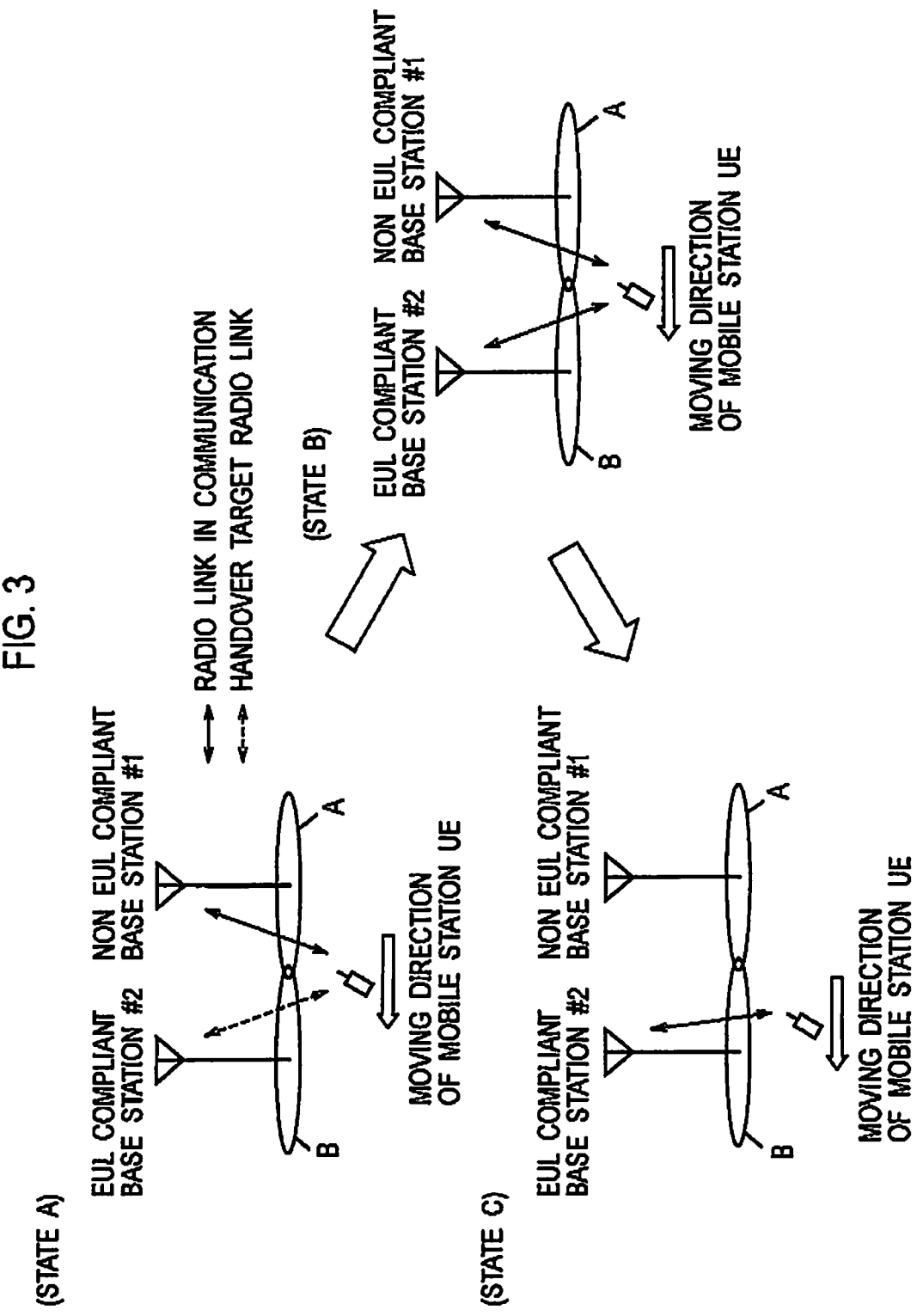
FIG. 3 is a view for explaining change of a communication state of the mobile communication system according to the first embodiment of the present invention.

As shown in FIG. 3, a mobile station UE establishes, in a state A, a HSDPA communication compliant radio link and at least one radio link not including an EUL communication compliant radio link only with the non EUL compliant base station #1.

Further, after moving from a cell A in a direction toward a cell B, the mobile station UE maintains, in a state B, the HSDPA communication compliant radio link and at least one radio link not including an EUL communication compliant radio link, with the cell A under the control of the non EUL compliant base station #1, and at the same time establishes a HSDPA communication compliant radio link and an EUL communication compliant radio link with the cell B under the control of the EUL compliant base station #2.

Thereafter, after further moving from the cell A in the direction toward the cell B, the mobile station UE releases, in a state C, the radio links with the cell A under the control of the non EUL compliant base station #1, and maintains the HSDPA communication compliant radio link and the EUL communication compliant radio link only with the cell B under the control of the EUL compliant base station #2.

Figure 4:
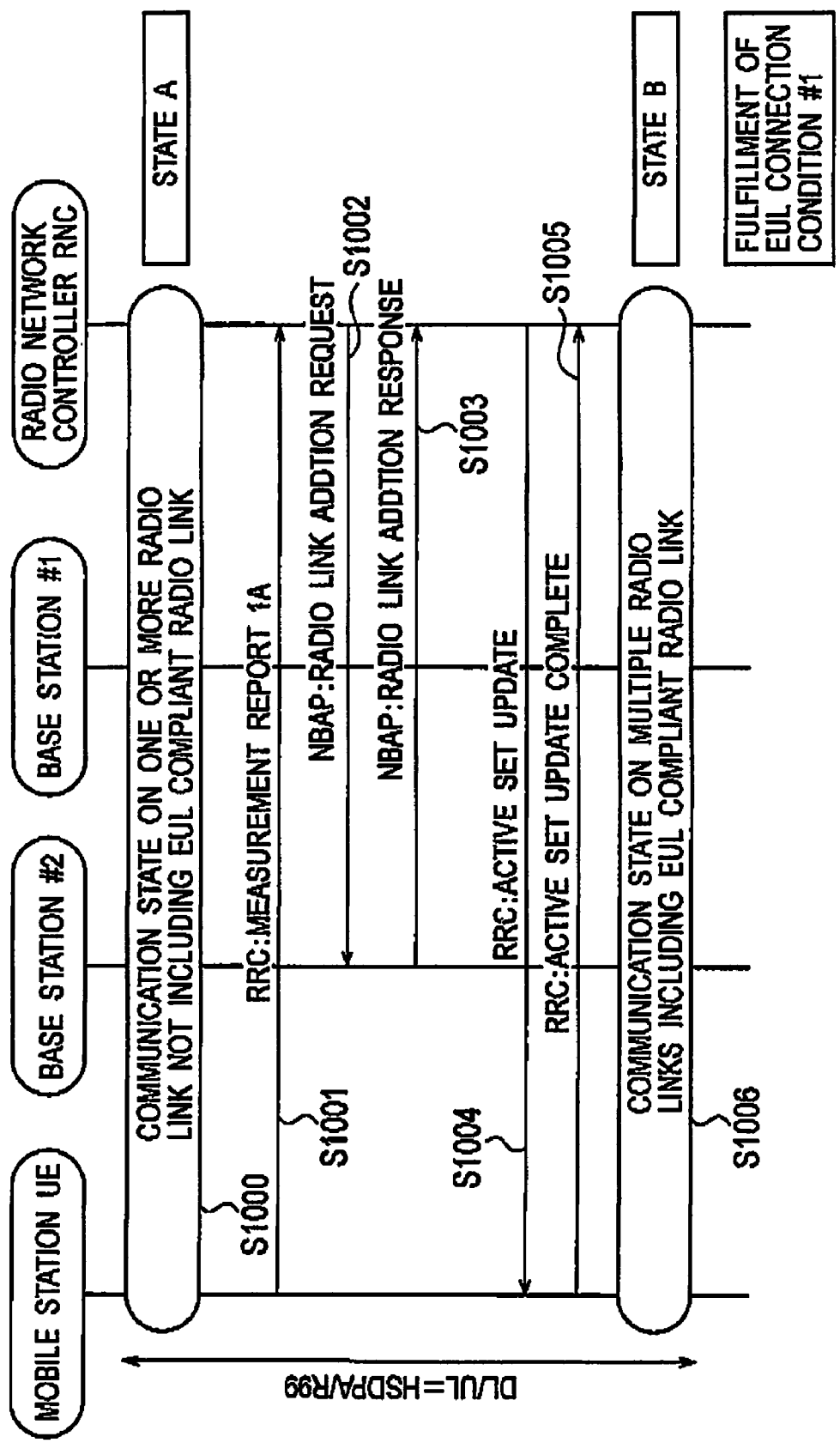
FIG. 4 is a sequence diagram showing an example of operation in which an EUL connection condition #1 is fulfilled in the mobile communication system according to the first embodiment of the present invention.
Figure 5:
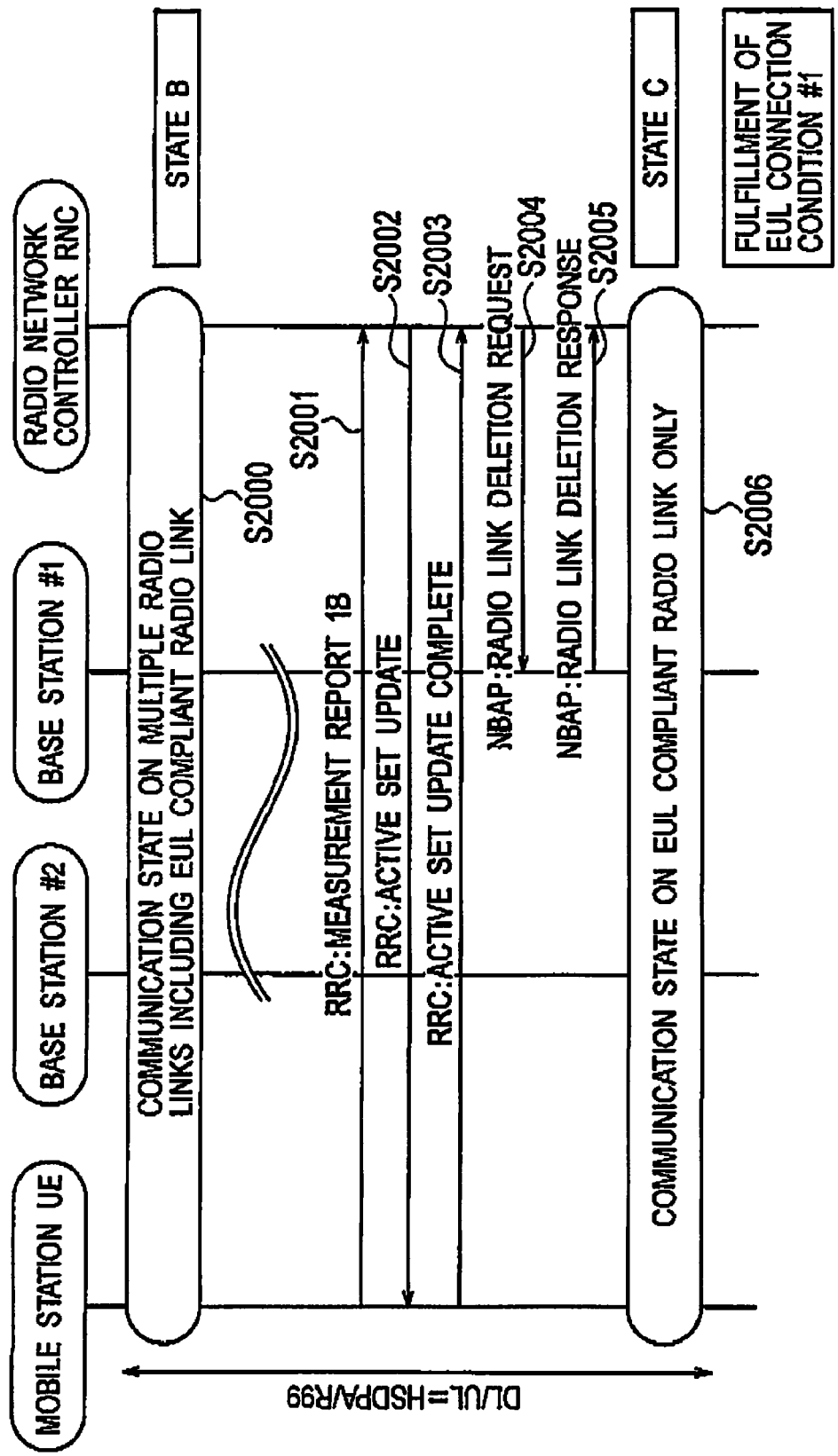
FIG. 5 is a sequence diagram showing an example of operation in which an EUL connection condition #1 is fulfilled in the mobile communication system according to the first embodiment of the present invention.

Firstly, with reference to FIG. 4, description is given of a first operation at the time of the fulfillment of an EUL connection condition #1 in the mobile communication system according to this embodiment.

As shown in FIG. 4, in Step S1000, a mobile station UE performs HSDPA communication by using a HSDPA communication compliant radio link, and performs uplink packet communication (R99 communication) by using at least one radio link not including an EUL communication compliant radio link, with a cell A under the control of an non EUL compliant base station #1, in a state A (first communication state).

In Step S1001, when a predetermined condition is satisfied, in Step S1001, the mobile station UE transmits, to a radio network controller RNC, a message 1A (RRC signaling) indicating "Measurement Report".

In Step S1002, in response to the received message 1A of "Measurement Report", the radio network controller RNC determines to establish an EUL communication compliant radio link between the mobile station UE and a cell B under the control of an EUL compliant base station #2, and transmits, to the EUL compliant base station #2, a message (NBAP signaling) indicating "Radio Link Addition Request" for notifying the above determination.

In Step S1003, in response to the message of "Radio Link Addition Request", the EUL compliant base station #2 transmits a message (NBAP signaling) indicating "Radio Link Addition Response" to the radio network controller RNC.

In Step S1004, the radio network controller RNC transmits, to the mobile station UE, a message (RRC signaling) indicating "Active Set Update" for notifying that the EUL communication compliant radio link is to be established between the mobile station UE and the cell B under the control of the EUL compliant base station #2.

In Step S1005, in response to the message of "Active Set Update", the mobile station UE transmits a message (RRC signaling) indicating "Active Set Update Complete" to the radio network controller RNC.

In Step S1006, the mobile station UE establishes a HSDPA communication compliant radio link and the EUL communication compliant radio link with the cell B under the control of the EUL compliant base station #2.

In the first operation, in Step S1006, it is determined that the EUL connection condition #1 has been fulfilled. However, in this state, EUL communication via the EUL compliant base station #2 has not been commenced yet.

Figure 6:
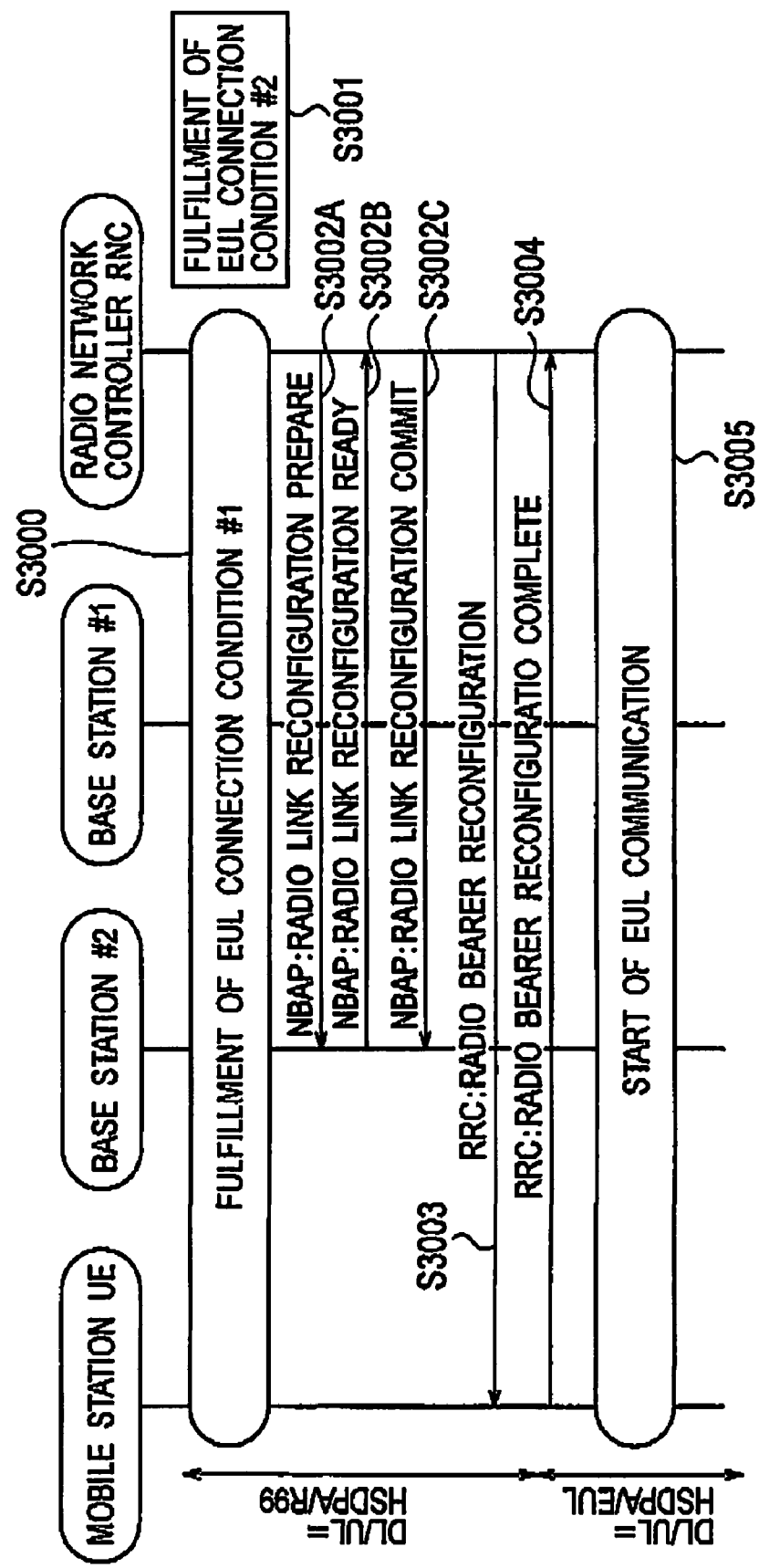
FIG. 6 is a sequence diagram showing an example of operation in which an EUL connection condition #2 is fulfilled in the mobile communication system according to the first embodiment of the present invention.

Secondly, with reference to FIG. 6, description is given of a second operation at the time of the fulfillment of the EUL connection condition #1 in the mobile communication system according to this embodiment.

In Step S2000, a mobile station UE performs HSDPA communication by using a HSDPA communication compliant radio link and uplink packet communication (R99 communication) by using at least one radio link not including an EUL communication compliant radio link, with a cell A under the control of a non EUL compliant base station #1, while performing HSDPA communication by using a HSDPA communication compliant radio link and uplink packet communication (R99 communication) by using an EUL communication compliant radio link, with a cell B under the control of an EUL compliant base station #2, in a state B.

In Step S2001, when a predetermined condition is satisfied, the mobile station UE transmits a message 18 (RRC signaling) indicating "Measurement Report" to a radio network controller RNC.

In Step S2002, in response to the received message 1B of "Measurement Report", the radio network controller RNC determines to delete the non EUL communication compliant radio link established between the mobile station UE and the cell A under the control of the non EUL compliant base station #1, and transmits, to the mobile station UE, a message (RRC signaling) indicating "Active Set Update" for notifying the above determination.

In Step S2003, in response to the message of "Active Set Update", the mobile station UE transmits a message (RRC signaling) indicating "Active Set Update Complete" to the radio network controller RNC.

In Step S2004, the radio network controller RNC transmits, to the non EUL compliant base station #1, a message (NBAP signaling) indicating "Radio Link Deletion Request" for notifying the deletion of the EUL communication compliant radio link established between the mobile station UE and the cell A under the control of the non EUL compliant base station #1.

In Step S2005, in response to the message of "Radio Link Deletion Request", the non EUL compliant base station #1 transmits a message (NBAP signaling) indicating "Radio Link Deletion Response" to the radio network controller RNC.

In Step S2006, the mobile station UE releases the HSDPA communication compliant radio link and the EUL communication compliant radio link established with the cell A under the control of the non EUL compliant base station #1.

In the second operation, in Step S2006, it is determined that the EUL connection condition #1 has been fulfilled. However, in this state, EUL communication via the EUL compliant base station #2 has not been commenced yet.

Thirdly, with reference to FIG. 6, description is given of a first operation at the time of the fulfillment of an EUL connection condition #2 in the mobile communication system according to this embodiment.

As shown in FIG. 6, when the EUL connection condition #1 is established in Step S3000 and it is determined that the EUL connection condition #2 is unconditionally fulfilled in Step S3001, a radio network controller RNC transmits a message (NBAP signaling) indicating "Radio Link Reconfiguration Prepare" to an EUL compliant base station #2, in Step S3002A.

Thereafter, when the EUL compliant base station #2 successfully secures an amount of resource large enough to configure an EUL communication compliant radio link, in Step S3002B, the EUL compliant bass station #2 transmits a message (NBAP signaling) indicating "Radio Link Reconfiguration Ready" to the radio network controller RNC.

Thereafter, in Steps S3002C and S3003, the radio network controller RNC transmits, to the EUL compliant base station #2 and a mobile station UE, a message (NBAP signaling) indicating "Radio Link Reconfiguration Commit" and a message (RRC signaling) indicating "Radio Bearer Reconfiguration," respectively, for instructing the EUL compliant base station #2 and the mobile station UE to commence the EUL communication via the EUL communication compliant radio link (that is, instructing to shift the mobile station UE from a first communication state to a second communication state).

In Step S3004, in response to the message of "Radio Bearer Reconfiguration," the mobile station UE transmits a message (RRC signaling) indicating "Radio Bearer Reconfiguration Complete" to the radio network controller RNC.

In Step S3005, EUL communication to be performed by the mobile station UE via the EUL communication compliant radio link is commenced, that is, the communication state of the mobile station UE shifts from the first communication state to the second communication state.

Meanwhile, when the EUL connection condition #1 corresponds to one shown in FIG. 4, the HSDPA communication compliant radio link and the EUL communication compliant radio link established between the mobile station UE and the non EUL compliant base station #1 are released before the commencement of the EUL communication in Step S3005.

Figure 7:
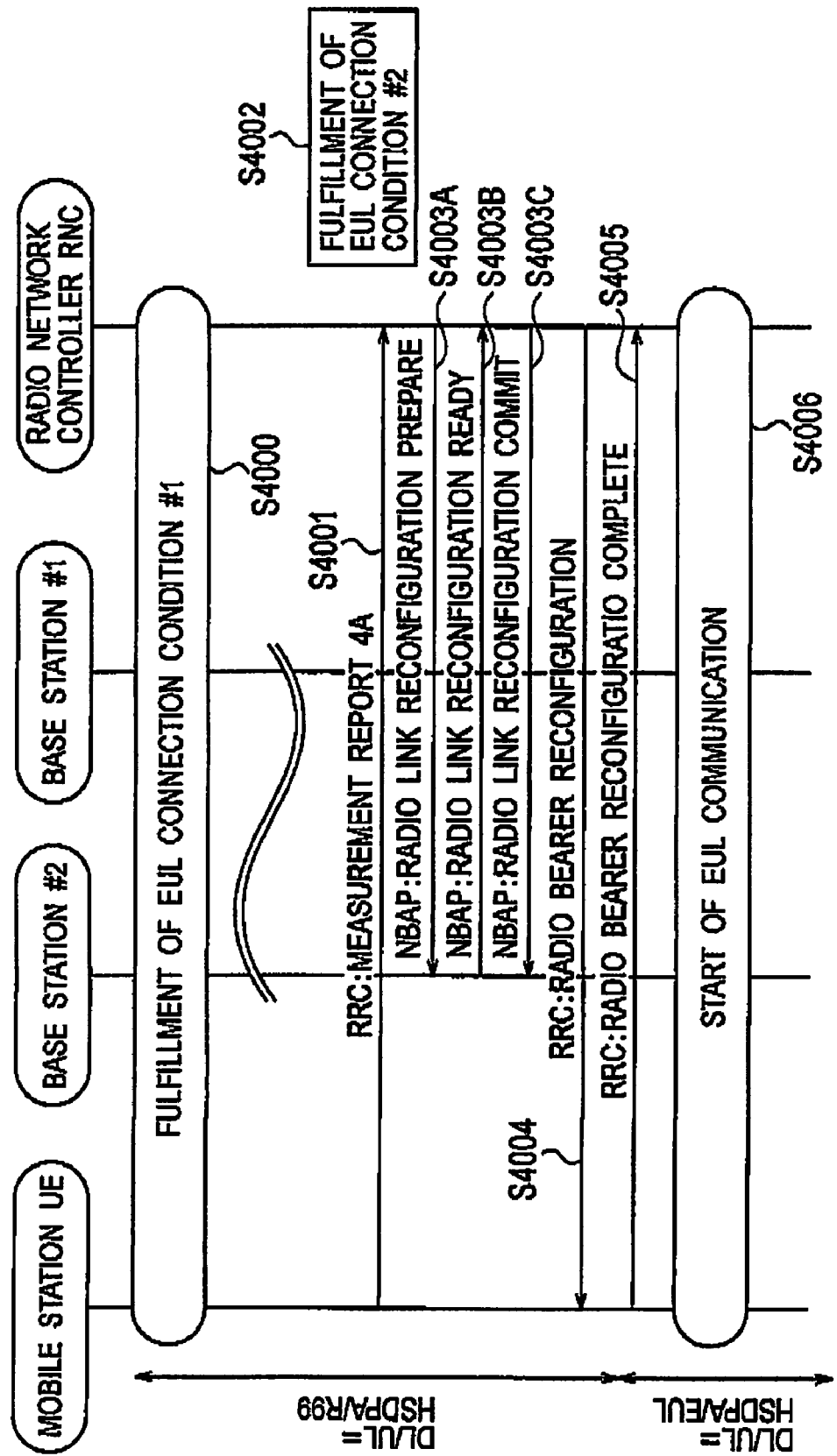
FIG. 7 is a sequence diagram showing an example of operation in which an EUL connection condition #2 is fulfilled in the mobile communication system according to the first embodiment of the present invention.

Fourth, with reference to FIG. 7, description is given of a second operation at the time of the fulfillment of the EUL connection condition #2 in the mobile communication system according to this embodiment.

As shown in FIG. 7, in Step S4000, an EUL connection condition #1 is fulfilled.

In Step S4001, when a predetermined condition is satisfied (for example, when an amount of data in a transmission buffer exceeds a predetermined threshold value), a mobile station UE transmits a message 4A (RRC signaling) indicating "Measurement Report" to a radio network controller RNC.

In Step S4002, in response to the received message 4A of "Measurement Report", when determining that the amount of data in the transmission buffer of the mobile station UE has exceeded the predetermined threshold value, the radio network controller RNC determines that the EUL connection condition #2 has been fulfilled.

Operations of Steps S4003A to S4006 are the same as those of Steps S3002A to S3005 shown in FIG. 6.

Figure 8:
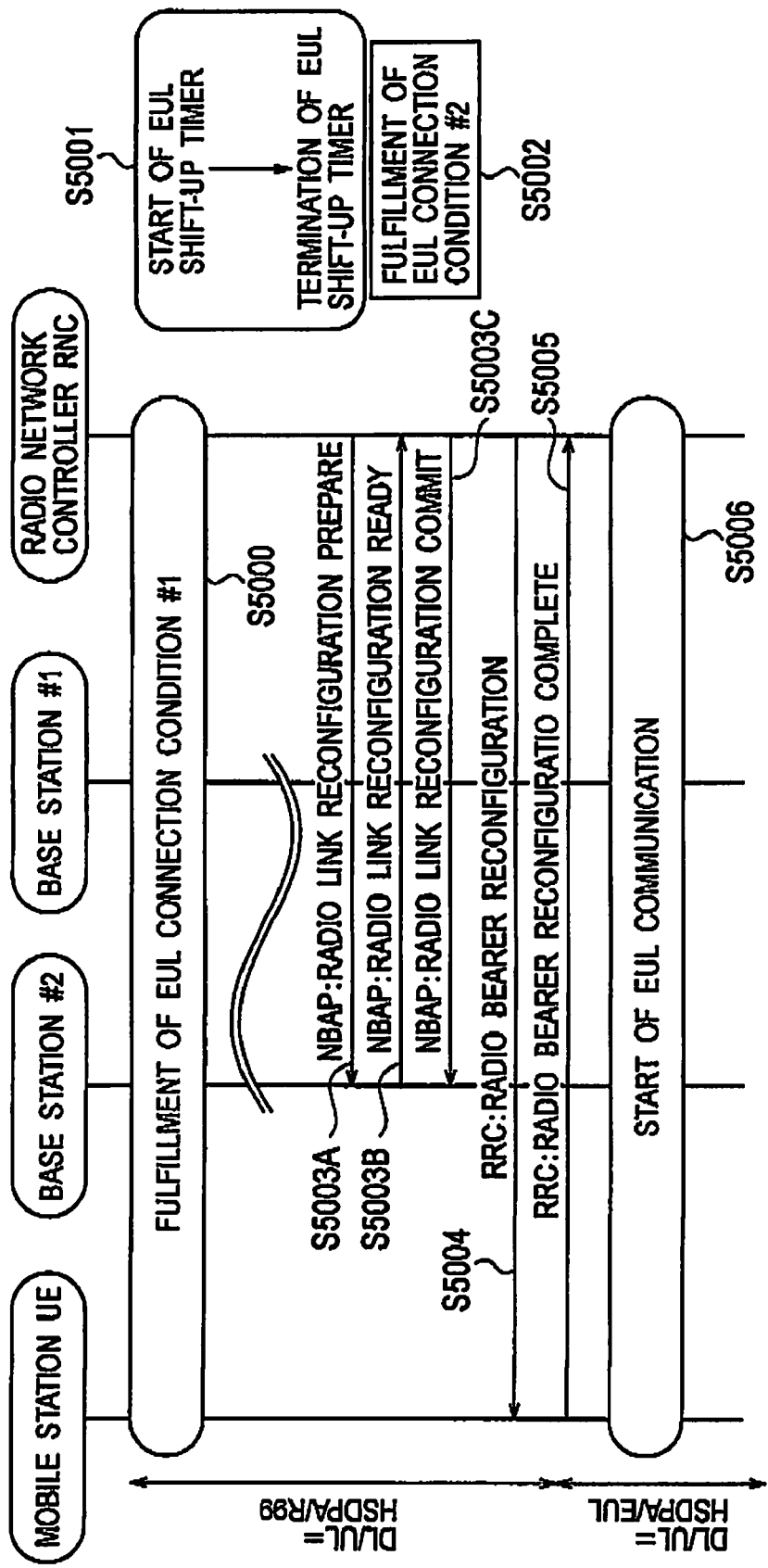
FIG. 8 is a sequence diagram showing an example of operation in which an EUL connection condition #2 is fulfilled in the mobile communication system according to the first embodiment of the present invention.

Fifthly, with reference to FIG. 8, description is given of a third operation at the time of the fulfillment of the EUL connection condition #2 in the mobile communication system according to this embodiment.

As shown in FIG. 8, in Step S5000, an EUL connection condition #1 is fulfilled.

In Step S5001, when a predetermined period has elapsed after the fulfillment of the EUL connection condition #1, that is, when an EUL shift-up timer started in Step S5001 has expired, a radio network controller RNC determines that the EUL connection condition #2 has been fulfilled, in Step S5002.

Operations of Steps S5003A to S5006 are the same as those of Steps S3002A to S3005 shown in FIG. 6.

Figure 9:
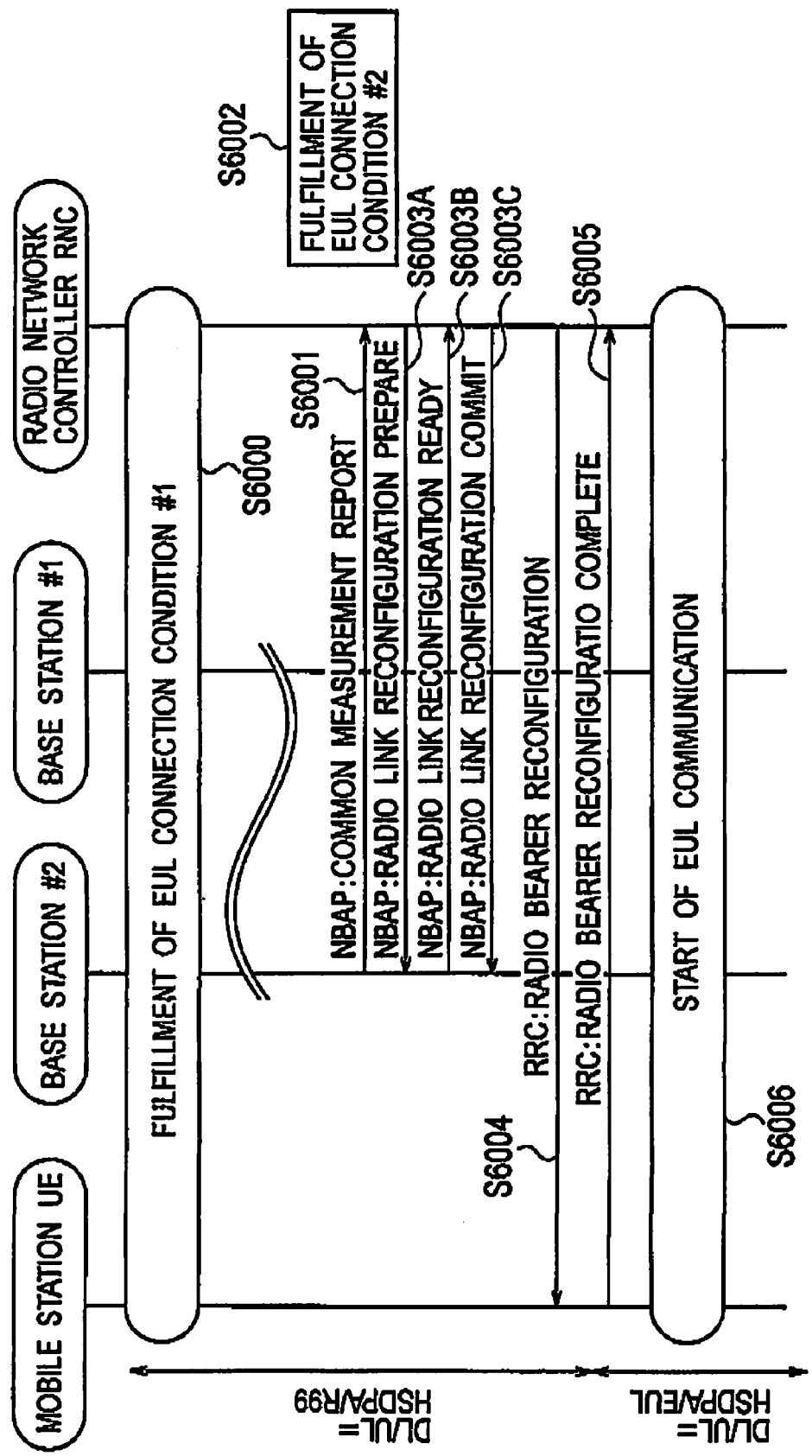
FIG. 9 is a sequence diagram showing an example of operation in which an EUL connection condition #2 is fulfilled in the mobile communication system according to the first embodiment of the present invention.

Sixth, with reference to FIG. 9, description is given of a fourth operation at the time of the fulfillment of the EUL connection condition #2 in the mobile communication system according to this embodiment.

As shown in FIG. 9, in Step S6000, an EUL connection condition #1 is fulfilled.

In Stop S6001, when a predetermined condition is satisfied (for example when a predetermined resource is available, or when a predetermined resource is not available), an EUL compliant base station #2 transmits, to a radio network controller RNC, a message (NBAP signaling) indicating "Common Measurement Report" for notifying an available resource of the EUL compliant base station #2.

In Step S6002, in response to the received message of "Common Measurement Report", when determining that the predetermined available resource exists in the EUL compliant base station #2, the radio network controller RNC determines that the EUL connection condition #2 has been fulfilled.

Operations of Steps S6003A to S6006 are the same as those of Steps S3002A to S3005 shown in FIG. 6.

(Operations and Effects of the Mobile Communication System According to the First Embodiment of the Present Invention)

In the mobile communication system according to this embodiment, when both EUL connection conditions #1 and #2 are fulfilled, a mobile station UE in a first communication state can shift to a second state. Accordingly, even when the mobile station UE in the first communication state has moved to a cell B under the control of an EUL compliant base station #2 compliant with both HSDPA communication and EUL communication, it is possible to solve the problem that the mobile station UE is not capable of commencing the EUL communication.

Further, in the mobile communication system according to this embodiment, the system can be configured not to commence EUL communication even when the EUL connection condition #1 is fulfilled, on the basis of determination that the EUL communication is not necessary when an amount of data in a transmission buffer of the mobile station UE does not exceed a predetermined threshold value.

Further, in the mobile communication system according to this embodiment, the system can be configured not to commence the EUL communication until a predetermined period of time elapses even when the EUL connection condition #1 is fulfilled. Therefore, the EUL communication can be commenced after a determination is performed that the present environment is not one in which an UEL communication compliant radio link established by the mobile station UE is released.

Still further, in the mobile communication system according to this embodiment, the system can be configured not to commence the EUL communication even when the EUL connection condition #1 is fulfilled, on the basis of a determination that the EUL communication cannot be performed when a predetermined resource is not available in the EUL compliant base station #2.

(Modification 1)

In a mobile communication system according to a modification 1 of the present invention, the following is used as an EUL connection condition #1, "At least one EUL communication compliant radio link (high speed uplink packet communication) is established by a mobile station UE," that is, "among radio links included in an active set of the mobile station UE, at least one radio link becomes an UEL communication compliant radio link".

Further, in the mobile communication system according to the modification 1, the following is used as an EUL connection condition #2, A serving cell for high speed downlink packet communication (HSDPA communication) of the mobile station UE in the first state is switched to a base station with which a high speed uplink packet communication (EUL communication) compliant radio link is established.

The "serving cell" is a cell which can control mainly radio communication of the mobile station UE. Meanwhile, 3GPP defines that a serving cell for high speed downlink packet communication (HSDPA communication) and a serving cell for high speed uplink packet communication (EUL communication) are the same in the mobile station UE.

The mobile communication system according to the modification 1 is described below with reference to FIG. 10 while comparing with the mobile communication system according to the above-mentioned first embodiment.

Figure 10:
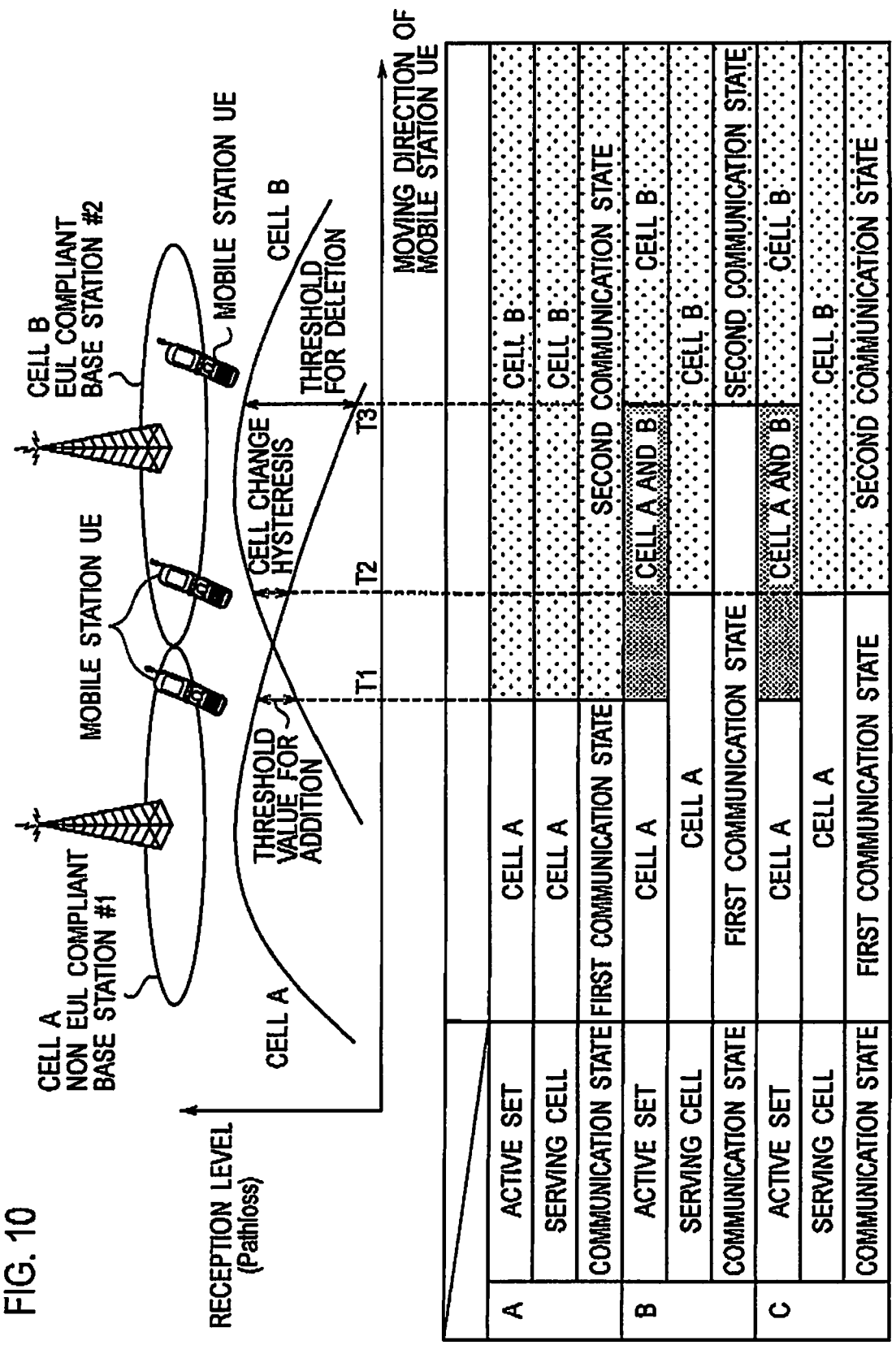
FIG. 10 is a view for explaining a mobile communication system according to a modification of the present invention.

Firstly, a case A shown in FIG. 10 is described. In the case A, as an EUL connection condition #1, the following is used, "At least, one EUL communication (high speed uplink packet communication) compliant radio link is established by a mobile station UE", and as an EUL connection condition #2, "No condition" is used (cases shown in FIGS. 4 and 6).

In the case A, in a period until T1, the mobile station UE is in a first communication state, and an active set (for uplink packet communication) of the mobile station UE includes only a radio link for uplink packet communication established with a cell A under the control of an non EUL compliant base station #1, and a serving cell (a serving cell for HSDPA communication) of the mobile station UE is the cell A.

Thereafter, at time T1 when, in the mobile station UE, a difference between a reception level from the cell A and a reception level from a cell B reaches a threshold value for addition, the mobile station UE shifts to a second communication state, and the active set (for uplink packet communication) of the mobile station UE is switched so as to include only a radio link for uplink packet communication established with the cell B under the control of an EUL compliant base station #2, and the serving cell (the serving cell for HSDPA communication and EUL communication) for the mobile station UE is switched to the cell B.

Secondly, a case B shown in FIG. 10 is described. In the case B as an EUL connection condition #1, the following is used, "All the radio links for uplink packet communication in a mobile station UE are established as high speed uplink packet communication (EUL communication) compliant radio links", as an EUL connection condition #2, "No condition" is used (cases shown in FIGS. 5 and 6).

In the case B, in a period until T1, the mobile station UE is in a first communication state, and an active set (for uplink packet communication) of the mobile station UE includes only a radio link for uplink packet communication established with a cell A under the control of a non EUL compliant base station #1, and a serving cell (a serving cell for HSDPA communication) of the mobile station UE is the cell A.

Subsequently, at time T1 when, in the mobile station UE, a difference between a reception level from the cell A and a reception level from a cell B reaches a threshold value for addition, an active set (for uplink packet communication) of the mobile station UE is switched so as to include both a radio link for uplink packet communication established with the cell A under the control of the non EUL compliant base station #1, and a radio link for uplink packet communication established with the cell B under the control of an EUL compliant base station #2. However, at this time, the mobile station UE is still in the first communication state, and the serving cell (the serving cell for HSDPA communication) of the mobile station UE is still the cell A.

At time T2 when, in the mobile station UE, a reception level from the cell B becomes larger than that from the cell A and a difference between the reception levels from the cells A and B becomes a cell change hysteresis, the serving cell (the serving cell for HSDPA communication) of the mobile station UE is switched to the cell B. However, even at this time, the mobile station UE is still in the first communication state.

Thereafter, at time T3 when, in the mobile station UE, a difference between the reception levels from the cells A and B reaches a threshold value for deletion, the mobile station UE shifts to a second communication state for the first time.

Thirdly, a case C (that is, a case of this modification 1) shown in FIG. 10 is described.

In the case C, in a period until T1, a mobile station UE is in a first communication state, and an active set (for uplink packet communication) of the mobile station UE includes only a radio link for uplink packet communication established with a cell A under the control of a non EUL compliant base station #1, and a serving cell (a serving cell for HSDPA communication) of the mobile station UE is the cell A.

Subsequently, at time T1 when, in the mobile station UE, a difference between a reception level from the cell A and a reception level from a cell B reaches a threshold value for addition, an active set (for uplink packet communication) of the mobile station UE is switched so as to include both a radio link for uplink packet communication established with the cell A under the control of the non EUL compliant base station #1, and a radio link for uplink packet communication established with the cell B under the control of an EUL compliant base station #2. However, at this time, the mobile station UE is still in the first communication state, and the serving cell (the serving cell for HSDPA communication) of the mobile station UE is still the cell A.

Thereafter, at time T2 when, in the mobile station UE, a reception level from the cell B becomes larger than that from the cell A and a difference between the reception levels from the cells A and B becomes a cell change hysteresis, the mobile station UE shifts to a second communication state, and the serving cell (the serving cell for HSDPA communication) is switched to the cell B.

Note that the performances of the above-mentioned mobile station UE, the radio base station Node B and the radio network controller RNC may be implemented by hardware, by a software module executed by a processor, or by a combination of the two.

The software module may be provided in a storage medium of any form such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, and a CD-ROM.

The storage medium is connected to a processor so that the processor can read and write information from and to the storage medium. The storage medium may otherwise be integrated in a processor. The storage medium and the processor may be provided within an ASIC, and the ASIC may be provided in a mobile station UE, a radio base station NodeB and a radio network controller RNC. Otherwise, the storage medium and the processor may be provided in each of a mobile station UE, a radio base station NodeB and a radio network controller RNC as discrete components.

Hereinabove, the present invention has been described in detail by use of the embodiment. However, it is obvious to those skilled in the art that the present invention is not limited to the embodiment described herein. The present invention may be implemented as a modification and a variation, within the spirit and scope of the present invention defined by the scope of claims. Accordingly, the present specification aims to provide an exemplary description and does not limit the present invention in any way.

What is claimed is:

1. A mobile communication system in which a mobile station shifts from a first communication state to a second communication state, the first communication state being a state in which the mobile station performs high speed downlink packet communication by using a high speed downlink packet communication compliant radio link, and performs uplink packet communication by using at least one radio link not including a high speed uplink packet communication compliant radio link, the second communication state being a state in which the mobile station performs the high speed downlink packet communication by using the high speed downlink packet communication compliant radio link, and performs high speed uplink packet communication by using the high speed uplink packet communication compliant radio link, wherein
when at least one high speed uplink packet communication compliant radio link is established by the mobile station in the first communication state, the mobile station in the first communication state shifts to the second communication state, wherein
when at least one high speed uplink packet communication compliant radio link is established by the mobile station in the first communication state, and when an amount of data in a transmission buffer of the mobile station in the first communication state exceeds a predetermined threshold value, the mobile station in the first communication state shifts to the second communication state.

2. The mobile communication system according to claim 1, wherein
when a predetermined period has elapsed after at least one high speed uplink packet communication compliant radio link is established by the mobile station in the first communication state, the mobile station in the first communication state shifts to the second communication state.

3. The mobile communication system according to claim 1, wherein
when at least one high speed uplink packet communication compliant radio link is established by the mobile station in the first communication state, and when a predetermined available resource exists in a base station with which the high speed uplink packet communication compliant radio link has been established, the mobile station in the first communication state shifts to the second communication state.

4. The mobile communication system according to claim 1, wherein
when at least one high speed uplink packet communication compliant radio link is established by the mobile station in the first communication state, and when a serving cell for the high speed downlink packet communication of the mobile station in the first communication state is switched to a base station with which the high speed uplink packet communication compliant radio link has been established, the mobile station in the first communication state shifts to the second communication state.

5. A mobile communication system in which a mobile station shifts from a first communication state to a second communication state, the first communication state being a state in which the mobile station performs high speed downlink packet communication by using a high speed downlink packet communication compliant radio link, and performs uplink packet communication by using at least one radio link not including a high speed uplink packet communication compliant radio link, the second communication state being a state in which the mobile station performs the high speed downlink packet communication by using the high speed downlink packet communication compliant radio link, and performs high speed uplink packet communication by using the high speed uplink packet communication compliant radio link, wherein
when all radio links for the uplink packet communication of the mobile station in the first communication state are established as high speed uplink packet communication compliant radio links, the mobile station in the first communication state shifts to the second communication state, wherein when all radio links for the uplink packet communication of the mobile station in the first communication state are established as the high speed uplink packet communication compliant radio links, and when an amount of data in a transmission buffer of the mobile station in the first communication state exceeds a predetermined threshold value, the mobile station in the first communication state shifts to the second communication state.

6. The mobile communication system according to claim 5, wherein when a predetermined period has elapsed after all radio links for the uplink packet communication of the mobile station in the first communication state are established as the high speed uplink packet communication compliant radio links, the mobile station in the first communication state shifts to the second communication state.

7. The mobile communication system according to claim 5, wherein when all radio links for the uplink packet communication of the mobile station in the first communication state are established as the high speed uplink packet communication compliant radio links, and when a predetermined available resource exists in a base station with which the high speed uplink packet communication compliant radio link has been established, the mobile station in the first communication state shifts to the second communication state.

8. A mobile communication method by which a mobile station shifts from a first communication state to a second communication state, the first communication state being a state in which the mobile station performs high speed downlink packet communication by using a high speed downlink packet communication compliant radio link, and performs uplink packet communication by using at least one radio link not including a high speed uplink packet communication compliant radio link, the second communication state being a state in which the mobile station performs the high speed downlink packet communication by using the high speed downlink packet communication compliant radio link, and performs high speed uplink packet communication by using the high speed uplink packet communication compliant radio link, the method comprising;

causing the mobile station in the first communication state to shift to the second communication state when at least one high speed uplink packet communication compliant radio link is established by the mobile station in the first communication state.

9. A mobile communication method by which a mobile station shifts from a first communication state to a second communication state, the first communication state being a state in which the mobile station performs high speed downlink packet communication by using a high speed downlink packet communication compliant radio link, and performs uplink packet communication by using at least one radio link not including a high speed uplink packet communication compliant radio link, the second communication state being a state in which the mobile station performs the high speed downlink packet communication by using the high speed downlink packet communication compliant radio link, and performs high speed uplink packet communication by using the high speed uplink packet communication compliant radio link, the method comprising;

causing the mobile station in the first communication state to shift to the second communication state when all radio links for the uplink packet communication of the mobile station in the first communication state are established as high speed uplink packet communication compliant radio links.

10. A radio network controller used in a mobile communication system in which a mobile station shifts from a first communication state to a second communication state, the first communication state being a state in which the mobile station performs high speed downlink packet communication by using a high speed downlink packet communication compliant radio link, and performs uplink packet communication by using at least one radio link not including a high speed uplink packet communication compliant radio link, the second communication state being a state in which the mobile station performs the high speed downlink packet communication by using the high speed downlink packet communication compliant radio link, and performs high speed uplink packet communication by using the high speed uplink packet communication compliant radio link, wherein when at least one high speed uplink packet communication compliant radio link is established by the mobile station in the first communication state, the radio network controller instructs the mobile station in the first communication state to shift to the second communication state.

11. The radio network controller according to claim 10, wherein when at least one high speed uplink packet communication compliant radio link is established by the mobile station in the first communication state, and when an amount of data in a transmission buffer of the mobile station in the first communication state exceeds a predetermined threshold value, the radio network controller instructs the mobile station in the first communication state to shift to the second communication state.

12. The radio network controller according to claim 10, wherein when a predetermined period has elapsed after at least one high speed uplink packet communication compliant radio link is established by the mobile station in the first communication state, the radio network controller instructs the mobile station in the first communication state to shift to the second communication state.

13. The radio network controller according to claim 10, wherein when at least one high speed uplink packet communication compliant radio link is established by the mobile station in the first communication state, and when a predetermined available resource exists in a base station with which the high speed uplink packet communication compliant radio link has been established, the radio network controller instructs the mobile station in the first communication state to shift to the second communication state.

14. The radio network controller according to claim 10, wherein when at least one high speed uplink packet communication compliant radio link is established by the mobile station in the first communication state, and when a serving cell for the high speed downlink packet communication of the mobile station in the first communication state is switched to a base station with which the high speed uplink packet communication compliant radio link has been established, the radio network controller instructs the mobile station in the first communication state to shift to the second communication state.

15. A radio network controller used in a mobile communication system in which a mobile station shifts from a first communication state to a second communication state, the first communication state being a state in which the mobile station performs high speed downlink packet communication by using a high speed downlink packet communication compliant radio link, and performs uplink packet communication by using at least one radio link not including a high speed uplink packet communication compliant radio link, the second communication state being a state in which the mobile station performs the high speed downlink packet communication by using the high speed downlink packet communication compliant radio link, and performs high speed uplink packet communication by using the high speed uplink packet communication compliant radio link, wherein when all radio links for the uplink packet communication of the mobile station in the first communication state are established as high speed uplink packet communication compliant radio links, the radio network controller instructs the mobile station in the first communication state to shift to the second communication state.

16. The radio network controller according to claim 15, wherein when all radio links for the uplink packet communication of the mobile station in the first communication state are established as the high speed uplink packet communication compliant radio links, and when an amount of data in a transmission buffer of the mobile station in the first communication state exceeds a predetermined threshold value, the radio network controller instructs the mobile station in the first communication state to shift to the second communication state.

17. The radio network controller according to claim 15, wherein when a predetermined period has elapsed after all radio links for the uplink packet communication of the mobile station in the first communication state are established as the high speed uplink packet communication compliant radio links, the radio network controller instructs the mobile station in the first communication state to shift to the second communication state.

18. The radio network controller according to claim 15, wherein when all radio links for the uplink packet communication of the mobile station in the first communication state are established as the high speed uplink packet communication compliant radio links, and when a predetermined available resource exists in a base station with which the high speed uplink packet communication compliant radio link has been established, the radio network controller instructs the mobile station in the first communication state to shift to the second communication state.

\* \* \* \* \*